United States Patent
Ege et al.

(10) Patent No.: US 6,851,898 B2
(45) Date of Patent: Feb. 8, 2005

(54) DUST REMOVAL UNIT FOR A HAND TOOL DEVICE

(75) Inventors: Manfred Ege, Huglfing (DE); Josef Fünfer, Königsbrunn (DE); Josef Moser, Oberrohrdorf (CH)

(73) Assignee: Hilti Aktiengesellschaft, Schaan (LI)

( * ) Notice: Subject to any disclaimer, the term of this patent is extended or adjusted under 35 U.S.C. 154(b) by 109 days.

(21) Appl. No.: 10/106,964

(22) Filed: Mar. 26, 2002

(65) Prior Publication Data

US 2002/0141836 A1 Oct. 3, 2002

(30) Foreign Application Priority Data

Mar. 27, 2001 (DE) .......................................... 101 15 116

(51) Int. Cl.[7] .......................... B23G 11/00; B23B 47/00
(52) U.S. Cl. ..................................... 408/67; 408/241 S
(58) Field of Search .......................... 408/67, 110, 112, 408/241 S; 409/137

(56) References Cited

U.S. PATENT DOCUMENTS

| | | | | |
|---|---|---|---|---|
| 4,064,952 A | * | 12/1977 | Lechner ...................... | 175/209 |
| 4,207,953 A | | 6/1980 | Reibetanz et al. | |
| 5,090,499 A | * | 2/1992 | Cuneo ......................... | 175/209 |
| 5,113,951 A | * | 5/1992 | Houben et al. ................ | 173/75 |
| 5,129,467 A | * | 7/1992 | Watanabe et al. .............. | 173/75 |
| 5,199,501 A | * | 4/1993 | Kluber et al. .................. | 173/75 |
| 5,467,835 A | * | 11/1995 | Obermeier et al. .......... | 175/209 |
| 5,904,453 A | * | 5/1999 | Gavia .......................... | 408/67 |
| 6,146,066 A | * | 11/2000 | Yelton ........................ | 409/134 |

FOREIGN PATENT DOCUMENTS

| | | | |
|---|---|---|---|
| DE | 2546531 | | 4/1977 |
| DE | 2548100 | | 5/1977 |
| DE | 2925908 | * | 1/1981 |
| DE | 0426321 | | 5/1991 |
| EP | 0434295 | | 6/1991 |
| FR | 2702171 | | 9/1994 |
| GB | 2247852 A | * | 3/1992 |
| GB | 2294538 | | 5/1996 |

OTHER PUBLICATIONS

Patent Abstracts of Japan vol. 004, No. 143 (M–0335) Oct. 8, 1980 & K 55 096208 A OOI Takuto Jul. 22, 1980.

* cited by examiner

Primary Examiner—Daniel W. Howell
Assistant Examiner—Brian D. Walsh

(57) ABSTRACT

A dust removal unit (1) includes an adjustable axial depth stop (5) for an at least partially rotatable hand tool device (2) with a radially displaced, rotationally fixed, telescopable, axially limited movable suction tube assembly with a suction tube (4) running parallel to the axis (A) of the tool device (2) and coupled at one end to a suction head (3). The suction tube (4) includes an axially extending pleated bellows (6).

5 Claims, 1 Drawing Sheet

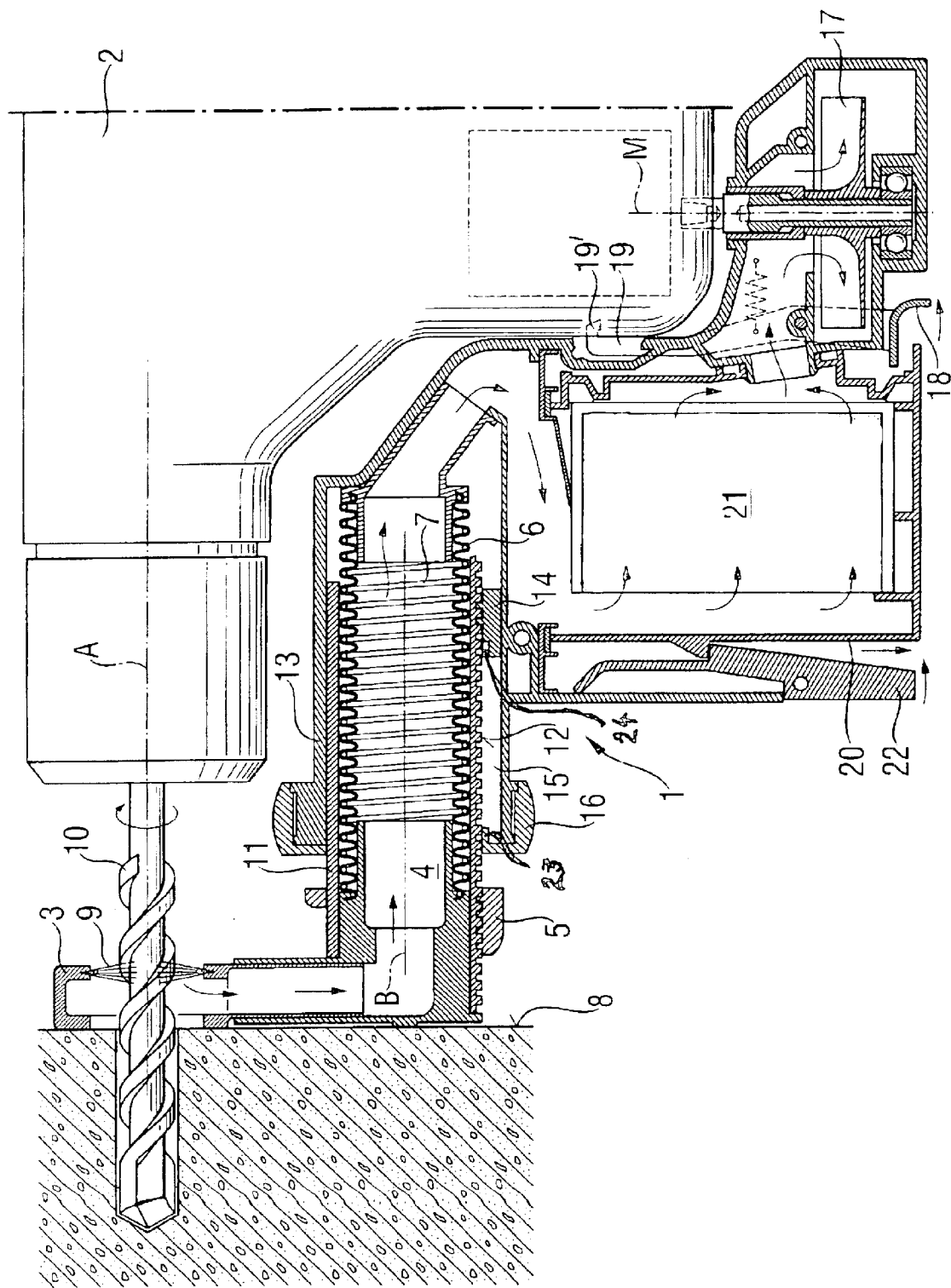

DUST REMOVAL UNIT FOR A HAND TOOL DEVICE

FIELD OF THE INVENTION

The invention relates to a dust removal unit for an at least partially rotating hand tool device, such as a drilling tool or a rotary hammer drill.

BACKGROUND OF THE INVENTION

The dust generated when performing drilling or chiseling work is unhealthy for the worker, creates additional workload and increases the wear and tear on hand tools.

The dust suction device according to EP470048B1 is provided in the form of a unit that can be combined with the driving hand tool device, wherein a suction wheel can be rotationally fixed to a driving shaft of the hand tool device.

According to DE4335417A1 a dust collector that includes a bellows-like filter element, can be fitted rotationally and pivotally into the dust suction device combined with a hand tool device and sealingly locked therein and wherein a housing portion of the dust suction device can be flipped open by means of a hinge assembly.

According to DE2548100A1 the suction tube of a dust suction device is fashioned as a telescoping type arrangement parallel to the axis of the tool and enveloped externally by a spring-supported bellows. A hollow annular suction head is arranged at the end of the suction tube through which the tool can pass. The sensitive bellows, externally exposed, is a disadvantage, especially in the rough environment of the building trades.

According to U.S. Pat. No. 5,993,122 a spring-biased mounting for a terminal suction head is disclosed and has an adjustable axial limitation means. The suction hose is additionally coupled with the suction head and thus creates an obstacle.

According to U.S. Pat. No. 4,207,953 a depth stop with a terminally arranged hollow-ring shaped suction head is fashioned as a suction tube arranged parallel to the axis of the tool, a helical spring is contained within the suction tube. The obstructive suction hose coupled directly to the hand tool device, which conducts the dust through the hand tool device, is a disadvantage.

SUMMARY OF THE INVENTION

The object of the invention is to provide a robust dust removal unit incorporating a depth stop. A further object consists in the simple mounting of a dust container in the dust removal unit and on the hand tool device.

Essentially the dust removal unit for an at least partially rotary hand tool device combined therewith is comprised of an axially limited, radially offset, rotationally fixed, telescoping, movable suction tube running parallel to the axis of the tool and coupled with a suction head, the suction tube has an adjustable axial depth stop, and the suction tube includes a pleated bellows.

Damage to the pleated bellows in the rough environment of the building construction is prevented by the arrangement of the bellows within the suction tube assembly.

An advantage is that the suction tube is axially spring-biased, whereby the suction head arranged at the end of the suction tube automatically presses against the work surface and forms a vacuum seal.

A further advantage is that the pleated bellows is spring-supported, whereby the spring acts both on the axial pre-stressing and on the radial aperture.

Moreover, the suction head is equipped with brushes that are directed radially inwardly, whereby a tool passing coaxially therethrough can be received in a vacuum-tight manner.

A further advantage is that the telescoping, axially limited, movable inner part of the suction tube exhibits externally an essentially circular cross-section with an axially extending toothed surface, into which a depth stop arranged externally and coaxially can be at least selectively axially displaced.

Further advantageously, between the inner part and the outer part of the suction tube assembly, an axially limited movably and at least selectively, displaceable, rotationally lockable adjustment bar is arranged in the axial toothed surface with the bar being guided in an axially extending groove arranged radially within the outer part, and makes possible a rotation-resistant guiding of the terminally arranged suction head.

A further advantageous is an axially fixed, circumferentially displaceable to a limited extent, adjustment collar arranged on the outer part of the suction tube assembly at the axial transition to the inner part of the assembly, the collar is clippable in a form locked manner on both sides around the rotationally-lockable adjustment collar. Rotation of the adjustment collar makes possible, in conjunction with axial positioning of the inner part, lockable displacement of the adjustment bar and thus axial limitation of the automatically axially expanding suction tube.

On the other hand, the dust removal unit can be combined with the hand tool device, the dust removal unit includes a suction wheel that can be fixed against rotation and coupled with a shaft of the hand tool device, the dust removal unit has a rotationally mounted release lever that is actuated in the direction opposite the tooling direction releasing a locking member engaging the hand tool device.

The mounting makes possible simple assembly of the dust removal unit underneath the hand tool device by simple locking and simple dismantling by movement of the release lever opposite the tooling direction, so that such movement does not occur during proper use of the hand tool device.

Advantageously, two spring-biased locking devices, releasable using the release lever, are arranged bilaterally offset relative to the plane of symmetry of the hand tool device, whereby in cooperation with the suction wheel guide on the driving shaft of the hand tool device a mounting at at least three points not situated on a straight line is provided and thus an immovable mounting results.

Advantageously, the release lever is arranged on the underside of the dust removal unit, where no manipulation occurs when the hand tool device is properly operated.

Advantageously, a dust container, preferably with an integrated bellows filter, that can be removed downwards, is arranged adjacent to the release lever, whereby a compact construction is achieved.

Advantageously, the dust container itself is simply releasably mounted using a rotationally spring-biased, member and further is advantageously actuated from below opposite to the tooling direction.

BRIEF DESCRIPTION OF THE DRAWING

The invention is more completely described with reference to an advantageous exemplary embodiment read together with an axially extending sectional side view of a dust removal unit.

DETAILED DESCRIPTION OF THE INVENTION

According to the drawing, a dust removal unit is mounted on a hand tool device 2, at least partially rotating around a tool working axis A. The dust removal unit 1 is characterized by a radially offset, rotationally fixed, suction tube assembly including suction tube 4 telescopable axially to a limited extent and having an axis B parallel to the working axis A and coupled at one end with a terminal suction head 3. The suction tube assembly has an adjustable axial depth stop 5. The suction tube 4 includes a pleated bellows 6 coaxial with the axis B and axially opened by an inner spring 7 and is compressed axially against a work surface 8 and abuts against the work surface in a vacuum tight manner. The suction head 3 is equipped with radially inwardly directed brushes 9 encircling working axis A, and in contact with a drilling tool 10. The suction tube assembly includes a telescoping, axially limitedly movable inner part 11 encircling the suction tube 4 and has an essentially circular cross-section and an axially extending toothed surface 12 on which the externally arranged depth stop 5 is selectively axially displaceable and twist-lockable. A clamp bar 14 is movable axially to a limited extent and is selectively axially displaceable relative to the inner part 11 and is twist-lockable in the axial toothed surface 12, the clamp bar is arranged between the inner part 11 and an outer part 13 of the suction tube assembly. The clamp bar 14 is guided in an axially extending internal groove 15 in the outer part 13. An axially fixed, circumferential displaceable collar 16 is arranged on the outer part 13 at the transition to the inner part 11 of the suction tube assembly, and the collar can circumferentially bilaterally lock the internal twist-locking clamp bar 14. The dust removal unit has a rotationally-fixed suction wheel 17 coupled to a shaft M of the hand tool device 2 and as viewed in the drawing, a rotatably mounted release lever 18 located on the underside of the hand tool device, so, that when actuated opposite to the working direction releases two spring-biased locking means 19, 19' on the hand tool device 2, though only one is shown in the drawing. A dust container 20 having an integrated bellows-type filter 21 is downwardly removable, and is arranged adjacent to the release lever 18. The dust container 20 is arranged to be simply released using a rotationally spring-biased mounted release 22 that can be operated from below opposite to the working direction.

What is claimed is:

1. A dust removal unit for an at least partially rotatable hand tool device (2) having a working axis (A) comprises a suction tube assembly including a suction tube (4) having an axis (B) radially offset from and parallel to said working axis (A), said suction tube (4) is telescopable to a limited axial extent, a suction head (3) encircling said working axis (A) and connected to a first end of said suction tube (4), said dust removal unit includes a depth stop (5) axially adjustable relative to said axis (B) of said suction tube (4), said suction tube (4) comprises a pleated bellows (6) extending axially along and encircling said axis (B) said suction tube assembly comprises a telescopable inner part (11) encircling said suction tube (4) and axially movable to a limited extent said inner part (11) has a substantially circular cross-section and an axially extending radially outer toothed surface member (12), with the toothed surface thereof facing radially outwardly and with said depth stop (5) axially displaceable along and lockable with the toothed surface member (12).

2. A dust removal unit, as set forth in claim 1, wherein said suction tube (4) is spring biased in the axial direction.

3. A dust removal unit, as set forth in claim 1, wherein said pleated bellows (6) is internally spring supported.

4. A dust removal unit, as set forth in claim 1, wherein said suction head (3) comprises brushes radially inwardly directed toward said working axis (A).

5. A dust removal unit, as set forth in claim 1, wherein said suction head (3) and said suction tube assembly each have a planar surface arranged to engage a surface (8) to be worked by the hand tool device (2), said suction tube has a second end spaced axially from the first end thereof and arranged to convey dust into a dust container (20), and a suction wheel (17) connected to said dust container (20) and in operative connection with a shaft (M) of said hand tool device (2).

* * * * *